United States Patent [19]

Lywood et al.

[11] Patent Number: 5,048,284
[45] Date of Patent: Sep. 17, 1991

[54] METHOD OF OPERATING GAS TURBINES WITH REFORMED FUEL

[75] Inventors: Warwick J. Lywood, Yarm; Jeremy C. B. Hunns, Caldicot; Peter J. Davidson, Darlington, all of England

[73] Assignee: Imperical Chemical Industries PLC, London, United Kingdom

[21] Appl. No.: 378,070

[22] Filed: Jul. 11, 1989

Related U.S. Application Data

[63] Continuation-in-part of Ser. No. 181,031, Apr. 13, 1988, Pat. No. 4,938,685, which is a continuation-in-part of Ser. No. 52,004, May 20, 1987, Pat. No. 4,788,004.

[30] Foreign Application Priority Data

May 27, 1986 [GB] United Kingdom ............... 8612777
Apr. 13, 1987 [GB] United Kingdom ............... 8708776
Jul. 11, 1988 [GB] United Kingdom ............... 8816440

[51] Int. Cl.$^5$ .............................................. F02C 3/20
[52] U.S. Cl. ................................. 60/39.02; 60/39.05; 60/39.12
[58] Field of Search ............... 60/39.02, 39.05, 39.12, 60/39.465, 39.59, 39.06, 723; 431/4, 7

[56] References Cited

U.S. PATENT DOCUMENTS

| | | | |
|---|---|---|---|
| 3,765,167 | 10/1973 | Rudolph et al. | 60/39.12 |
| 3,895,488 | 7/1975 | Koch | 60/39.51 |
| 4,185,456 | 1/1980 | Cummings | 60/39.12 |
| 4,193,259 | 3/1980 | Muenger et al. | |

FOREIGN PATENT DOCUMENTS

| | | | |
|---|---|---|---|
| 923316 | 4/1963 | United Kingdom | 60/39.12 |
| 1138165 | 12/1968 | United Kingdom | 60/39.12 |

Primary Examiner—Louis J. Casaregola
Attorney, Agent, or Firm—Cushman, Darby & Cushman

[57] ABSTRACT

At least during some part-load operation of a gas turbine wherein a fuel gas is combusted with air with the formation of a flame and the combustion products are let down through a turbine, the fuel gas comprises the product of a stage of catalytic autothermal steam reforming of a light hydrocarbon feedstock gas and the amount of air fed to the gas turbine combuster, relative to the amount of hydrocarbon fed to the catalytic autothermal steam reforming stage, is greater than the maximum amount of air that enables a flame to be sustained in said combustor if that amount of hydrocarbon were to be fed directly to the combustor.

11 Claims, 3 Drawing Sheets

METHOD OF OPERATING GAS TURBINES WITH REFORMED FUEL

This invention relates to gas turbines and in particular to gas turbines employing a light, i.e. normally gaseous or low boiling liquid, hydrocarbon fuel such as natural gas or naphtha.

In the operation of a gas turbine, a fuel in the gaseous state, hereinafter termed a fuel gas, and at superatmospheric pressure is combusted with air, also at superatmospheric pressure, with the formation of a flame, and the resulting hot gases are then passed from a combustion chamber through a turbine producing shaft power. The turbine normally drives the air compressor, and, where necessary, also the compressor for the fuel gas, as well as providing shaft power for export, e.g. driving an electricity generator.

In the interests of minimising pollution of the environment by the turbine effluent, it is desirable to operate the combustion with a fuel-lean, i.e. air-rich, mixture so that the flame temperature is as low as possible to minimise the formation of nitrogen oxides. However the flammability limits of the mixture dictate the minimum fuel-to-air ratio that may be employed. In particular, while it is often possible to operate a gas turbine at full-load with a mixture that is sufficiently lean to avoid serious nitrogen oxides formation, operation at that fuel-to-air ratio at part-load may cause instability and so a richer mixture has to be employed.

It has been proposed in FR-A-2577990 to steam reform, and in GB-A-1581334 to thermally crack, methanol to form the feed to a gas turbine.

It has also been proposed in DE-A-3440202 to use, as the feed to a gas turbine, the product obtained by catalytic steam reforming of a liquid fuel using heat recovered from the turbine exhaust as the heat required for reforming: however the heat recoverable from the turbine exhaust is at too low a temperature to effect significant reforming of light hydrocarbon fuels.

It has been proposed in U.S. Pat. No. 3,784,364 to employ, as a gas turbine fuel, the product of noncatalytic partial oxidation of a liquid hydrocarbon in the presence of steam to which a further quantity of liquid hydrocarbon and steam has been added to effect cooling of the partial oxidation gas.

It has been proposed in GB-A-1498429 to employ, as the fuel gas for a gas turbine, the product of partial oxidation of heavy fuel oil in the presence of steam, supplemented at times of peak load with methanol synthesised from the gas produced by the partial oxidation during off-peak periods.

We have realised that if the fuel is a light hydrocarbon gas or liquid, such as natural gas or naphtha, by subjecting the fuel to catalytic autothermal steam reforming at least during part-load operation, a reformed product may be produced that can be used as the feed to the gas turbine combustor, enabling operation of the latter under leaner conditions, even at turbine part-loads, thereby giving lower flame temperatures.

It has been proposed in GB-A-1485834 to reduce nitrogen oxides formation in an internal combustion engine by operating under lean conditions using as the fuel the product from a gas generator wherein a liquid hydrocarbon fuel is partially oxidised to give a hot, partially combusted gas stream which is then mixed with steam and subjected to steam reforming. That reference also suggests that the gas generator may be used to supply the feed to a gas turbine.

We have found that by using a light hydrocarbon fuel and adding the steam to the fuel prior to the partial combustion, the temperature of the partial combustion can be moderated thereby reducing nitrogen oxides formation with minimal carbon lay-down on the reforming catalyst: with higher hydrocarbon fuels such moderation by the addition of steam prior to partial combustion is not feasible in view of the risk of substantial carbon lay-down.

Accordingly the present invention provides a method of operating a gas turbine wherein a compressed mixture of a fuel gas and air is combusted in a turbine combustor with the formation of a flame and the combustion products are let down through a turbine producing shaft power, wherein, at least during some part-load operation of the turbine, said fuel gas comprises the product of a stage of catalytic autothermal steam reforming of a light hydrocarbon feedstock having a boiling point at atmospheric pressure below 220° C., said catalytic autothermal steam reforming stage comprising reacting a gas containing the light hydrocarbon feedstock and steam with an amount of air insufficient to cause complete combustion and then passing the resultant hot partially combusted mixture over a catalyst that exhibits steam reforming activity, and during that part-load operation, the amount of air fed to the gas turbine combustor, relative to the amount of hydrocarbon fed to the catalytic autothermal steam reforming stage, is greater than the maximum amount of air that enables a flame to be sustained in said combustor if that amount of hydrocarbon were to be fed directly to the combustor.

By the term air we include oxygen-enriched air and oxygen-depleted air in addition to normal air.

The light hydrocarbon feedstock may be a low boiling hydrocarbon feedstock, i.e. normally gaseous having a boiling point at atmospheric pressure below ambient temperature, or it may be liquid at atmospheric pressure and ambient temperature. However it should have an atmospheric pressure boiling point (final boiling point in the case of mixtures) below 220° C. Preferably the light hydrocarbon feedstock comprises methane or natural gas. Hydrocarbon feedstocks having a higher boiling point may be used if, prior to feeding to the catalytic autothermal reforming stage, they are converted to lower hydrocarbons by preheating, e.g. by heat exchange with the turbine exhaust, followed by passage, together with steam, over a suitable reforming catalyst, for example supported nickel. As described hereinafter, such preliminary heating and catalytic reforming may also be of utility when using the aforesaid light hydrocarbons. If the light hydrocarbon feedstock is liquid at ambient temperature and atmospheric pressure, it should be preheated before feeding to the catalytic autothermal reformer so that, at the pressure at which the catalytic autothermal reforming is effected, it is in the gaseous state. For convenience the gas containing the light hydrocarbon and steam fed to the catalytic autothermal steam reforming stage is hereinafter referred to as the feedstock gas.

If a mixture of the feedstock gas and air is combusted with the formation of a flame, there is a maximum amount of air that can be employed in order that a flame can be sustained. This is set by the flammability limit of the mixture. The flame temperature is determined by the feedstock gas to air ratio: providing the amount of air is sufficient for complete combustion, increasing the amount of air decreases the flame temperature. It is therefore seen that there is a minimum flame temperature, set by the flammability limit of the feedstock gas in air, that can be achieved.

In the present invention, by subjecting the feedstock gas to catalytic autothermal steam reforming prior to feeding to the gas turbine combustor, part of the feedstock gas is converted to hydrogen and carbon oxides, e.g. in accordance with the reactions:

$$CH_4 + H_2O \rightarrow 3H_2 + CO$$

$$CH_4 + 2H_2O \rightarrow 4H_2 + CO_2$$

(assuming for simplicity that the light hydrocarbon is methane).

The resultant reformed gas will thus contain hydrogen, carbon monoxide, and carbon dioxide, in addition to methane resulting from incomplete reforming and the conversion of any higher hydrocarbons to methane in the reforming process. As explained below, it will generally also contain some nitrogen. It will generally also contain steam as a result of the use of an excess of steam over that consumed in the reforming operation. The flammability limits of this gas mixture will differ from those of the feedstock gas: however as indicated by the above equations there is also a volume increase upon steam reforming. The net result is that the amount of air that can be fed to the turbine combustor while sustaining a flame therein is significantly greater than if the feedstock gas had been fed directly to the turbine combustor. As a consequence the flame temperature is reduced, with the result that the nitrogen oxides formation is decreased.

As mentioned above, the problems of instability in the turbine combustor when employing the feedstock gas directly as the fuel thereto and operating under lean conditions, arise particularly at turbine part-loads, i.e. when full power is not required from the turbine. At full-load, it may be possible to operate the turbine with the feedstock gas directly as the fuel gas to the turbine combustor under conditions sufficiently lean that nitrogen oxides formation is not a significant problem. Consequently it is within the ambit of the present invention to provide for an at least partial by-pass of the catalytic autothermal reforming operation so that, at full load, the fuel gas to the turbine combustor comprises unreformed feedstock gas, optionally admixed with some reformed feedstock gas. It will be appreciated that such a by-pass may also be operative during part-load operation: however during some part-load operations, the fuel gas comprises at least some reformed feedstock gas.

At part-load, the amount of feedstock gas employed will generally be less than at full-load. Consequently the amount of by-pass can in some cases be regulated such that, as the amount of feedstock gas is increased, so the proportion thereof that by-passes the steam reforming stage is increased. As mentioned above, the reforming operation gives rise to an increase in volume of the fuel gas fed to the turbine combustor. Thus in some cases it is possible to regulate the amount of by-pass such that the amount of fuel gas, or the total amount of fuel gas and air, fed to the turbine combustor remains within predetermined limits. In some cases the by-pass can be regulated such that the amount of fuel gas, or the amount of fuel gas and air, fed to the turbine combustor remains substantially constant.

The steam reforming reaction is endothermic. The heat contained in the turbine exhaust is generally at too low a temperature to effect sufficient reforming of light hydrocarbon feedstocks and so another source of heat is required. In the present invention the necessary heat is supplied by employing a catalytic autothermal steam reforming process wherein the feedstock gas is reacted with air in an amount insufficient to cause complete combustion and the resultant hot partially combusted gas stream is passed over a catalyst that exhibits steam reforming activity. The catalyst preferably is also a catalyst for the combustion of the feedstock gas so that passage of a mixture of the feedstock gas and air over the catalyst results in partial combustion and then, as the partially combusted gas passes further over the catalyst, reforming takes place. Where, at least initially, the partial combustion is effected catalytically, it is preferred that the feed to the partial combustion stage contains some hydrogen as this renders the catalytic combustion more facile.

In one form of the invention hydrogen is introduced into the feedstock gas subjected to the catalytic autothermal reforming stage by using as the feedstock gas the product of a preliminary low temperature reforming stage, hereinafter termed a CRG stage. This CRG stage involves preheating a mixture of steam and at least one hydrocarbon, for example by heat exchange with the turbine exhaust, typically to a temperature in the range 450°–600° C., and passing the resultant preheated gas through a bed of a suitable low temperature steam reforming catalyst. Alternatively the gas may be heated while undergoing the catalytic reforming reaction by disposing the catalyst in tubes through which the mixture of steam and hydrocarbon feed is passed and heating the tubes by passing a suitable gas stream, for example the hot reformed gas stream from the autothermal reformer, or the turbine exhaust, past the exterior surfaces of those tubes. Examples of suitable reactors for effecting such a reforming process is described in EP-A-124226 and EP-A-194067. Suitable catalysts, commonly supported nickel, are commonly known as CRG catalysts. There may be a series of such CRG stages, with re-heating of the partially reformed gas from the CRG catalyst bed before passage through a further CRG catalyst bed. In this low temperature reforming, or CRG, stage some of the hydrocarbon is steam reformed giving a gas stream containing hydrogen. As mentioned hereinbefore, such a low temperature reforming, or CRG, stage can effect conversion of higher hydrocarbons to methane as well as effecting some reforming of the methane, and so, if a CRG stage is employed, the hydrocarbon in the mixture with steam fed to the CRG stage can contain one or more hydrocarbons having a boiling point at atmospheric pressure above 220° C., e.g. having a boiling point at atmospheric pressure of up to 240° C. or more.

Where a CRG stage is employed, the CRG catalyst bed may be in the same vessel as that employed for the catalytic autothermal reforming: the air required for the catalytic autothermal reforming is introduced after the hydrocarbon/steam mixture has passed through the CRG catalyst bed.

As mentioned above, the reformed gas will generally contain some nitrogen: this results from the air employed for the autothermal reforming and also from any nitrogen in the feedstock gas. Thus natural gas often contains a small amount of nitrogen. As mentioned above the reformed gas will also generally contain steam. This results from the use of an excess of steam in the feedstock gas over that consumed by the reforming reaction together with steam formed during the partial combustion step.

A particularly suitable process and apparatus for effecting the catalytic autothermal reforming is described in EP-A-254395 and EP-A-287238. In preferred forms of the invention the catalytic autothermal reforming operation comprises:
a) feeding the feedstock gas to a mixing zone;
b) separately feeding
   air, and
   the gas from the mixing zone, to the inlet of a combustion zone containing a combustion catalyst that also exhibits steam reforming activity,
   whereby partial combustion and reforming of the mixture takes place forming a hot reformed gas stream;
c) recycling part of the hot reformed gas stream to the aforesaid mixing zone; and
d) feeding the remainder of the hot reformed gas to the gas turbine combustor as fuel gas.

This embodiment has the advantage that recycle of part of the reformed gas to the combustion zone occurs thus introducing hydrogen into that zone, rendering the catalytic combustion facile. However, where the feedstock gas already contains hydrogen, e.g. as a result of a preliminary CRG stage as aforesaid, such a recycle arrangement is not necessary.

Whether or not a preliminary CRG stage with the heat provided by heat exchange with the turbine exhaust and/or a catalytic autothermal reforming stage having recycle is employed, at initial start-up, there is no heat from the turbine effluent to effect the preliminary CRG reforming and there is no recycle in the catalytic autothermal reformer. Consequently it is preferred that another direct or indirect source of hydrogen is available at initial start-up. This may be an indirect source of hydrogen, for example another source of heat for effecting the preheating for a CRG stage, or a direct source of hydrogen. For example heat, or a hydrogen-containing gas, e.g. fuel gas, may be supplied from a similar adjacent gas turbine arrangement. Alternatively a readily decomposed hydrocarbon derivative, such as methanol, may be added to the feedstock gas prior to passage to the catalytic autothermal reforming stage.

The amount of air employed in the partial combustion stage ot the catalytic autothermal reforming will depend on the desired degree of reforming and on the desired temperature of the reformed feedstock gas. Typically the amount of air is such that the autothermal reformer outlet temperature is in the range 600° to 800° C.

The steam required for the steam reforming in the catalytic autothermal reformer, and, where employed, in a preliminary CRG stage, may be raised, directly or indirectly, by indirect heat exchange with the turbine exhaust. Where it is raised indirectly, a stream of water may be heated by indirect heat exchange with the turbine exhaust to produce a stream of hot water which is then contacted with a gas stream comprising at least one hydrocarbon so as to saturate that gas stream thus forming a steam/hydrocarbon mixture which is used as, or to produce, the feedstock gas. The amount of steam introduced is preferably such that the feedstock gas contains 1 to 3.5 moles of steam per gram atom of hydrocarbon carbon in the feedstock gas. Where the steam required for the catalytic autothermal reforming stage (and CRG stage if used) is obtained by heat exchange with the turbine exhaust, again a separate source of steam will be required at initial start-up. Again this may be from an adjacent turbine arrangement.

The catalytic autothermal reforming stage is preferably operated at such a pressure that the reformed gas stream is at the desired gas turbine inlet pressure. Typically the partial oxidation and reforming stage is operated at a pressure in the range 5 to 40, particularly 10 to 30, bar abs. Likewise the CRG stage, if used, is operated at such a pressure that the product is at the inlet pressure of the catalytic autothermal reforming stage.

It is preferred that the catalytic autothermal steam reforming stage is operated under such conditions as to give a reformed feedstock gas containing above 25% by volume, on a dry basis, of hydrogen.

One result of the use of the steam reforming stage is that the temperature of the fuel gas fed to the turbine combustor is significantly greater than is conventional. If this is undesirable, the reformed gas can be cooled prior to entry into the turbine combustor. Such cooling may be by indirect heat exchange, e.g. with water used to raise the steam required for reforming, and/or with the feedstock and/or air prior to feeding to the catalytic autothermal reforming stage.

As indicated above, energy may be recovered from the turbine exhaust by indirect heat exchange with water to raise steam required for the steam reforming in the catalytic autothermal reforming (and CRG stage if used). Further heat exchange may be employed to preheat reactants and/or to provide for heat export.

Two embodiments of the invention will be described with reference to the accompanying drawings wherein FIG. 1 is a diagrammatic representation of the first embodiment showing a gas turbine coupled with a catalytic autothermal reformer;

Figure 1:
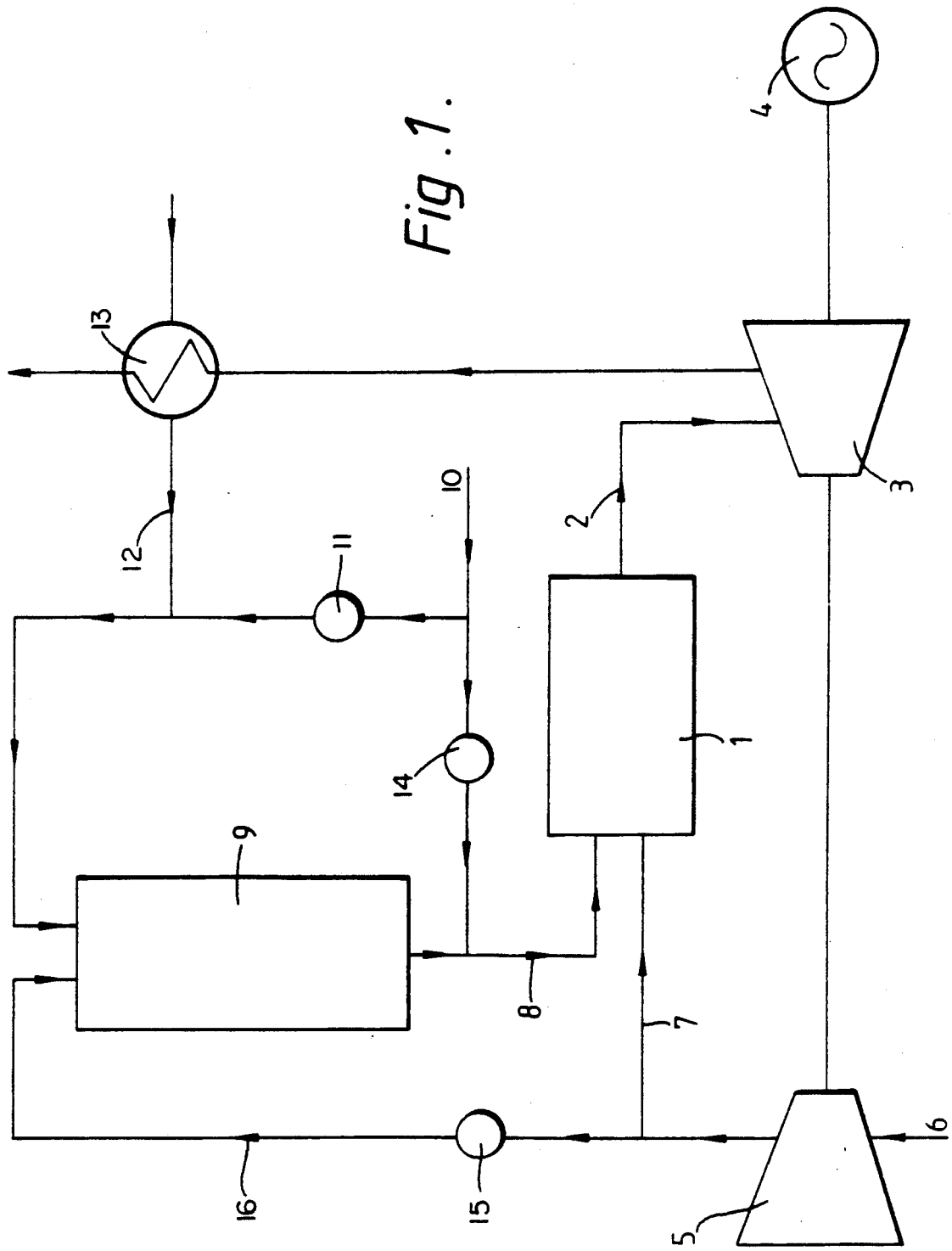

In FIG. 1 there is shown a gas turbine having a combustor zone 1, from which the hot combusted gases are fed, via line 2 to a turbine 3 providing shaft power driving a generator 4 and an air compressor 5. Air is fed to the air compressor via line 6 and from the compressor, typically at a temperature of 350° to 400° C. and at a pressure of 7 to 15 bar abs, to the combustor 1 via a line 7. Fuel gas is fed to the combustor 1 via a line 8 from a catalytic autothermal reformer designated generally by the reference numeral 9. A compressed light hydrocarbon feed gas, typically at a temperature of ambient to 250° C. and a pressure of 10 to 20 bar abs is fed to the autothermal reformer 9 via a line 10 and a control valve 11. Steam, typically at a temperature of 200° to 470° C. and at a pressure similar to that of the hydrocarbon feed gas, is added via line 12 to form the feedstock gas. This steam is raised in a boiler 13 heated by the turbine exhaust. A control valve 14 is provided such that, when open, unreformed light hydrocarbon feed gas can be fed directly to the fuel gas inlet line 8 of combustor 1. In an alternative arrangement, the steam injection line 12 is positioned upstream of valves 11 and 14 so that when the bypass is operating, the fuel gas fed to the combustor 1 contains steam. Likewise an air control valve 15 is provided in an air supply line 16, taken from line 7 and leading to the autothermal reformer 9, to regulate the amount of air fed to the autothermal reformer 9.

Figure 2:
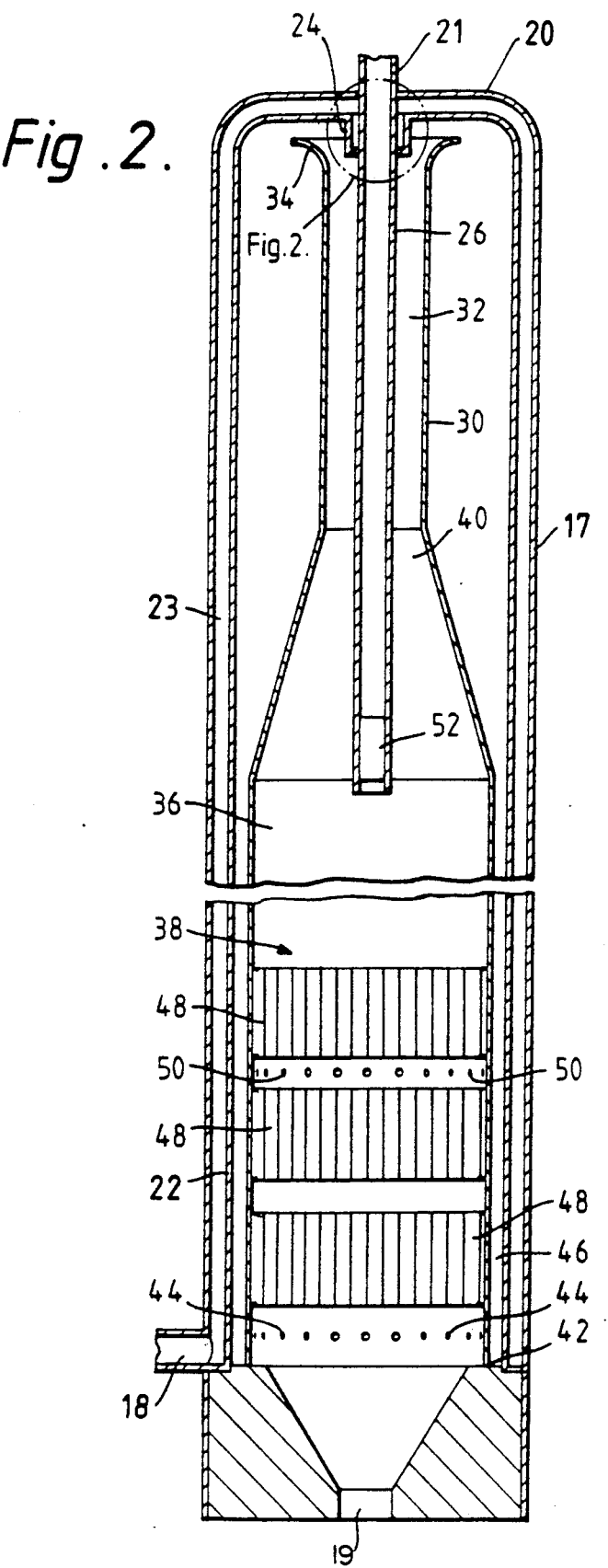
FIG. 2 is a diagrammatic longitudinal section through the autothermal reformer of FIG. 1.
Figure 3:
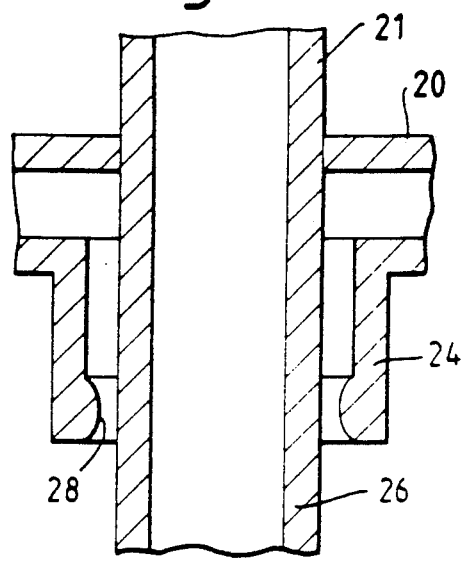
FIG. 3 is an enlargement of that part of FIG. 2 within the dotted line.

Referring to FIGS. 2 and 3, the autothermal reformer consists of an outer cylindrical shell 17 designed to withstand the process pressure. At one end of the shell 17 is an inlet port 18 for the feedstock gas, and an outlet port 19 for the reformed gas stream. Outlet port 19 connects to the fuel gas inlet line 8 of combustor 1. At the other end 20 of the shell 17 is an air inlet port 21 connected to the valve 15 via line 16 shown in FIG. 1. Located within the shell 17 and sealed thereto at the end adjacent inlet port 18 is a liner 22. Liner 22 extends almost to the other end 20 of the shell 17 and thus defines an annular conduit 23 between the interior surface of the shell 17 and the exterior surface of the liner 22. Inlet port 18 connects with this annular conduit 23. At the end 20 of the shell 17, liner 22 extends across the end of the shell 17, and terminates in a cylindrical portion 24 surrounding, but spaced from, an air supply pipe 26 extending from the air inlet port 21. The end of the cylindrical portion 24 that is remote from the end 20 of the shell 17 is provided with an inward enlargement 28, see FIG. 3, thus providing a constriction between the end of cylindrical portion 24 and the air supply pipe 26 to act as an ejector.

The conduit defined by liner 22, the wall of shell 17, the cylindrical portion 24, and the external surface of the air supply pipe 26, thus forms a supply means for delivering the feedstock gas from the inlet port 18. Since the structure is thus of the hot-wall type so that the gas flowing through conduit 23 acts as a coolant, the amount of refractory insulation, if any, required on the shell 17 can be kept relatively small.

Located within liner 22 is a elongated hollow member 30 of circular cross section. This hollow member has an inlet region 32 having an open, flared, end 34 adjacent the ejector terminating the feedstock gas supply, a combustion region 36 of greater cross section than the inlet region 32 and containing, at the end thereof remote from inlet region 32, the combustion catalyst 38, and a conical transition section 40 connecting the inlet region 32 with the combustion region 36. Below the combustion catalyst the lower end 42 of hollow member 30 is supported on the end of shell 17. Provision is made, e.g. by providing holes 44 through the wall of the hollow member 30 adjacent the end 42, for gas exiting the combustion catalyst 38 to enter the space 46 between the external surface of the hollow member 30 and the interior surface of liner 22. Part of the gas leaving the catalyst can thus enter space 46 while the rest leaves the shell 17 via outlet port 19.

The combustion catalyst 38 comprises a number of honeycomb sections 48 on the surface of which is deposited a suitable metal, e.g. platinum, that has combustion and steam reforming activity. Openings 50 are also provided in the wall of the hollow member 30 between adjacent sections of the honeycomb so that part of the gas stream can enter space 46 without passage through the whole of the combustion catalyst 38.

The air supply pipe 26 extending from inlet port 21 extends along the length of the inlet region 32 of hollow member 30 and terminates at the commencement of the combustion region 36 thereof. At the outlet of air supply pipe 26 there is provided a nozzle 52.

In operation the feedstock gas is fed under pressure to inlet port 18 and air is fed under pressure to inlet port 21. The feedstock gas flows up the space 23 between shell 17 and liner 22 and emerges through the ejector formed by inward enlargement 28, thereby forming a lower pressure region immediately downstream thereof. The mixture then flows down through the inlet region 32 and conical transition section 40 of hollow member 30, where it is mixed with air emerging from nozzle 52. The resultant mixture then flows through the combustion region 36 and the combustion catalyst 38 therein. Part of the gas stream leaving the combustion catalyst 38 flows out through outlet port 19. Because the pressure in the aforesaid lower pressure region is below the pressure of the reformed product gas, the remainder of the product gas flows through holes 44 into space 46 between hollow member 30 and liner 22 and then up towards the end 20 of the shell 17 and is drawn into the inlet region 32 of the hollow member 30 by the effect of the feedstock gas emerging from the ejector formed by inward enlargement 28. The recycled gas thus mixes with the feedstock gas and flows down through the hollow member 30.

On start-up initially some reaction takes place as the gas stream passes over the combustion catalyst 38, thereby creating a hot gas stream. The part of the hot gas stream entering the space 46 via holes 44 and recycling back to the inlet region 32 of hollow member 30 heats the feedstock gas flowing through annular conduit 23 thereby raising the temperature thereof so that the gas entering the combustion catalyst is preheated. The recycled hot gas stream also heats the air as the latter flows through the air inlet supply pipe 26 extending through the inlet region 32, and conical transition section 40 of the hollow member 30. With continued operation the temperature of the gas entering the combustion region 36 increases until the autoignition temperature is reached whereupon a flame is produced at the nozzle 52. Because of the reforming activity of the combustion catalyst 38, the hot gas stream leaving the combustion region 36 of hollow member 30, and hence the hot gas mixture that is recycled, will contain some hydrogen so that the gas mixture mixing with the air at nozzle 52 contains hydrogen, thereby enabling a flame to be established more rapidly at nozzle 52.

It will be appreciated that when a flame is established, the recycled hot gas flowing up that portion of the space 46 between the combustion region 36 of hollow member 30 and the inner surface of liner 22 will be heated by heat exchange across the wall of the combustion region 36 and at the same time will heat the feedstock gas flowing through the corresponding portion of annular conduit 23 between the inner surface of shell 10 and the outer surface of liner 22. As the recycled hot gas flows through that part of the space 46 between the external surface of the conical transition section 40 and inlet region 32 of the hollow member 30 and the interior surface of liner 22, it will heat not only the feedstock gas flowing through annular conduit 23 between shell 17 and liner 22, but also the gas flowing through the inlet region 32 and conical transition section 40 of the hollow member 30.

In an alternative embodiment the liner 22 is omitted and the shell 17 is provided with a refractory insulating layer on its interior surface. In this embodiment the feedstock gas supply comprises a pipe, coaxial with the air supply pipe 26, provided at its end with an inward enlargement, corresponding to inward enlargement 28 in FIG. 3, to form the constriction providing the ejector. In this embodiment there is therefore no preheating of the feedstock gas by the recycled hot gas before the feedstock gas leaves the feed pipe, but a heated mixture of the feedstock gas and the recycled hot gas is formed by the simple mixing of the two gas streams prior to the mixing with the air stream leaving the air supply pipe 26.

In either embodiment suitable projections may be provided on the exterior surface of the hollow member 30 to locate it in the desired spaced relation from liner 22 in the embodiment of FIG. 2 or from the refractory lining in the alternative embodiment. Likewise suitable spacers may be provided between the interior surface of the hollow member 30 in the inlet region 32 thereof and the air supply pipe 26 to maintain these components in the desired spaced relationship.

The autothermal reforming operation can conveniently be started up with the feedstock gas being fed at a predetermined rate to inlet port 18 and then the flow of air via line 16 to inlet port 21 is commenced at a slow rate, and then the air flow rate is gradually increased. At low air flow rates essentially all the combustion takes place in the initial portions of the combustion catalyst 38. Hence gas that is recycled through the holes 50 (if such holes are provided) is hotter than product gas that passes all the way through the combustion catalyst 38 (since the latter will cool as a result of heat transfer with colder combustion catalyst and as a result of endothermic reforming taking place) and so the recycled gas is hotter than if there had been no holes 50. By virtue of the recycled gas mixing with the incoming feedstock gas and, where there is a liner 22 as in the embodiment of FIG. 2, heat exchange across such a liner, the feedstock gas becomes preheated before it meets the incoming air stream. This preheating enables the catalytic combustion to occur earlier in the catalyst containing zone and so enables the air flow rate to be increased more rapidly. Within a short time the air flow rate can be increased to the level at which the reformed product gas has the desired flow rate and temperature. For any given apparatus and feedstock gas flow rate and composition, it will generally be found that the reformed gas outlet temperature and composition depends on the rate of supply of air to the combustion zone. Hence the process may readily be controlled by controlling the air flow rate by means of valve 15.

As the air flow rate is increased, the proportion of recycle within the autothermal reformer 9 will decrease because the addition of the air stream increases the mass of gas that is passing through the system but the "driving force" effecting the recycle, i.e. the product of the mass of the feedstock gas and the difference between the reformed gas outlet pressure and the pressure in the aforesaid region of lower pressure, remains essentially constant. Furthermore as the recycle gas stream becomes hotter, the efficiency of the ejector decreases.

It will be appreciated that if the temperature of the recycled hot gas and the degree of recycle is sufficient that the mixture of recycled hot gas, feedstock gas, and air stream attains the autoignition temperature, autoignition will occur with the production of a flame at the nozzle supplying the air stream. To avoid damage to the combustion catalyst by such a flame, it is preferred that the air supply means terminates well upstream of the catalyst so that the flame can occur in a catalyst-free space upstream of the catalyst.

It will further be appreciated that, since the product gas temperature can be controlled by controlling the rate of supply of the air stream, it is possible to control the process, if desired, such that the autoignition temperature is not achieved so that the combustion is totally catalytic. If it is intended that the process will be operated without achieving autoignition, then there is no need for a catalyst-free combustion zone upstream of the combustion catalyst: however sufficient space should be provided to ensure good mixing of the feedstock gas and air stream and even distribution of the mixture before encountering the combustion catalyst.

In the foregoing description, the start-up has been described with the assumption that the feedstock gas flow rate is kept essentially constant. It will be appreciated that this is not necessarily the case. Indeed where autoignition is established, the rate of feed of the feedstock gas and/or air stream can be increased considerably, after autoignition, since the rates are no longer limited by the need of obtaining combustion in the catalyst.

As indicated above, in some cases the light hydrocarbon feed gas need only be subjected to the reforming when operating the turbine under some part-load conditions. At greater loads, it may be possible to at least partially dispense with the reforming stage by closing valve 15, and also, if desired, valve 11 so that the light hydrocarbon feed gas, optionally together with steam, is fed directly to the turbine combustor via valve 14. Such operation may also be necessary when first starting-up the system as combustion has to be established in combustor 1 before steam can be raised for incorporation into the feedstock gas fed to autothermal reformer 9. Alternatively, the system can be started-up with import of steam or without the addition of steam so that the feed to the autothermal reformer 9 is the light hydrocarbon feed gas without any steam.

Figure 4:
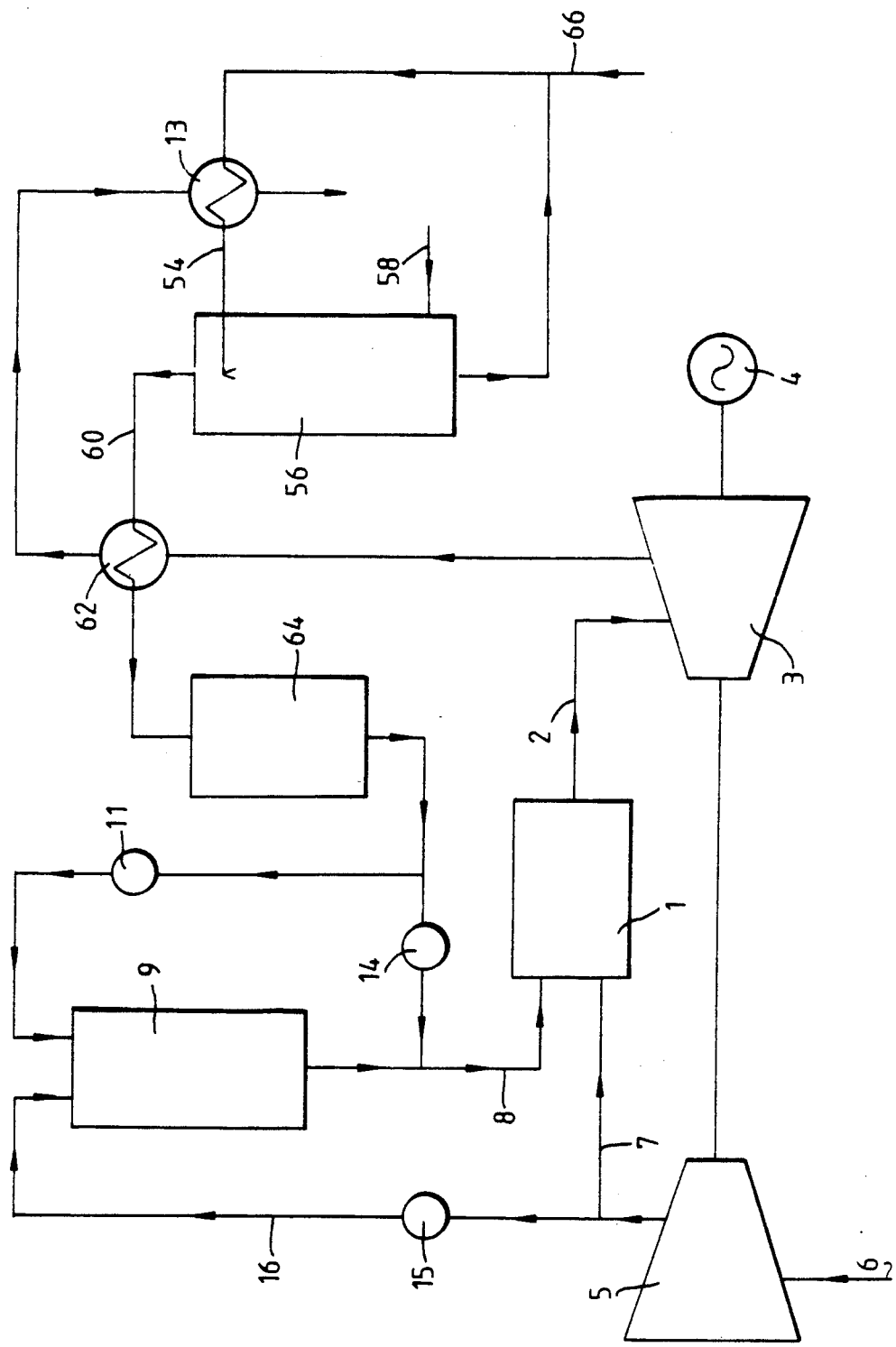
FIG. 4 is a diagrammatic representation of the second embodiment showing a gas turbine coupled with a catalytic autothermal reformer and a preliminary CRG stage.

In the embodiment shown in FIG. 4, the system is similar to that of FIG. 1. However instead of raising steam for direct addition via line 12, heat exchanger 13 is employed to heat water to give hot water which is fed, via line 54 to the top of a saturator tower 56 to the lower part of which a feed gas stream comprising at least one hydrocarbon component is fed via line 58. The resultant saturated gas stream leaves tower 56 via line 60, and is heated in heat exchanger 62 in the turbine exhaust duct. The heated mixture is then fed through a bed 64 of a CRG catalyst to effect preliminary low temperature reforming prior to feeding, via valve 11, to the autothermal reformer 9. The surplus water from the bottom of the saturator tower 56 is recycled, together with make-up water supplied via line 66, to heat exchanger 13.

In this embodiment it will be appreciated that CRG catalyst bed 64, and, if desired, also saturator 56, may be provided with a by-pass so that the hydrocarbon feed is fed directly to the gas turbine combustion zone 1 when operating at full load conditions.

As an example it is calculated that the leanest mixture that can be employed if pure methane is combusted as the fuel gas in combustor 1 at a flow rate of 100 kg mols/hr requires an air flow rate of 1900 kg mols/hr and that this gives rise to a flame temperature of 1536° C.

On the other hand, in accordance with the embodiment of FIGS. 1 and 2, methane is fed to the auto-thermal reformer 9 at the rate of 100 kg mols/hr, together with 150 kg mols/hr of steam, to give a feedstock gas at 480° C. at 14 bar abs. pressure. Air is also fed to the autothermal reformer 9 via line 15 at a rate of 85 kg mol/hr at 450° C. and at 14 bar abs. pressure. It is calculated that this will give a reformed gas mixture leaving outlet 19 at a rate of about 380 kg mols/hr at a temperature of 650° C. and having the approximate volume composition:

| methane | 18% |
|---|---|
| carbon monoxide | 2% |
| carbon dioxide | 6% |
| steam | 35% |
| hydrogen | 21% |
| nitrogen | 18% |

It is further calculated that if this reformed gas is fed, at the aforesaid rate of 380 kg mol/hr, as the fuel gas to the combustor 1, the leanest mixture for combustion requires an air flow rate to the combustor of about 2811 kg mol/hr giving a flame temperature of 1178° C.

This example therefore shows that, by autothermal reforming of the feedstock, the amount of air that can be fed to the combustor 1 can be increased by nearly 48% giving a decrease in the flame temperature of nearly 360° C.

In a further example, using the embodiment of FIG. 4, a mixture of 100 kg mol/hr of methane and 150 kg mol/hr of steam at a pressure of 14 bar abs. is preheated to 500° C. in heat exchanger 62 and passed through bed 64 containing a supported nickel CRG catalyst. The volume of catalyst is chosen to give an outlet temperature of 420° C. The gas (260 kg mol/hr) leaving bed 84 has the following approximate composition:

| methane | 36.5% |
|---|---|
| carbon monoxide | 0.1% |
| carbon dioxide | 1.9% |
| steam | 53.8% |
| hydrogen | 7.7% |

Autothermal reforming of this gas using 93 kg mol/hr of air to give a reformed gas outlet temperature of 650° C. in the autothermal reformer gives about 396 kg mol/hr of reformed gas of the following approximate composition:

| methane | 16.0% |
|---|---|
| carbon monoxide | 2.6% |
| carbon dioxide | 6.6% |
| steam | 31.8% |
| hydrogen | 24.5% |
| nitrogen | 18.5% |

Since the gas fed to the autothermal reformer 9 contains hydrogen as a result of the CRG stage, catalytic combustion of the feedstock gas in autothermal reformer is rendered facile without the use of a recycle-type reformer.

We claim:

1. A method of operating a gas turbine wherein a compressed mixture of a fuel gas and air is combusted in a turbine combustor with the formation of a flame and the combustion products are let down through a turbine producing shaft power, wherein said fuel gas comprises the product of a stage of catalytic autothermal steam reforming of a light hydrocarbon feedstock having a boiling point at atmospheric pressure below 220° C.,
said catalytic autothermal steam reforming stage comprising reacting a feedstock gas containing the light hydrocarbon feedstock and steam with an amount of air insufficient to cause complete combustion and then passing the resultant hot partially combusted mixture over a catalyst that exhibits steam reforming activity, and
the amount of air fed to the gas turbine combustor, relative to the amount of hydrocarbon fed to the catalytic autothermal steam reforming stage, is greater than the maximum amount of air that enables a flame to be sustained in said combustor if that amount of hydrocarbon were to be fed directly to the combustor.

2. A process according to claim 1 wherein the catalytic autothermal steam reforming stage comprises:
a) feeding the feedstock gas to a mixing zone and therein mixing it with hot recycle gas to form a heated gas mixture;
b) separately feeding air, and the heated gas mixture from the mixing zone, to the inlet of a combustion zone containing a combustion catalyst that also exhibits steam reforming activity, whereby partial combustion and reforming of the mixture takes place forming a hot reformed gas stream;
c) recycling part of the hot reformed gas stream to the aforesaid mixing zone as said hot recycle gas; and
d) feeding the remainder of the hot reformed gas to the gas turbine combustor as fuel gas.

3. A process according to claim 1 wherein the feedstock gas fed to the catalytic autothermal steam reforming stage contains hydrogen, in addition to the light hydrocarbon feedstock.

4. A process according to claim 3 wherein the feedstock gas fed to the catalytic autothermal steam reforming stage is the product of passing a heated mixture of steam and at least one hydrocarbon over a low temperature steam reforming catalyst,
whereby some preliminary steam reforming of said heated gas is effected before said feedstock gas is fed to the catalytic autothermal steam reforming stage.

5. A process according to claim 4 wherein said mixture of steam and at least one hydrocarbon is preheated by heat exchange with the turbine exhaust.

6. A process according to claim 4 wherein said mixture of steam and at least one hydrocarbon that is subjected to said preliminary reforming contains at least one hydrocarbon having a boiling point at atmospheric pressure above 220° C.

7. A process according to claim 1 wherein water is heated by heat exchange with the turbine exhaust to produce a stream of hot water which is then contacted with a gas stream comprising at least one hydrocarbon so as to form a steam/hydrocarbon mixture which is used as, or to produce, the feedstock gas.

8. A process according to claim 1 wherein the feedstock gas contains 1 to 3.5 moles of steam for each gram atom of hydrocarbon carbon in said feedstock gas.

9. A process according to claim 1 wherein said product of the catalytic autothermal steam reforming stage has a hydrogen content of at least 25% by volume on a dry basis.

10. A process according to claim 1 comprising, when operating said turbine under full load conditions, at least partially bypassing said catalytic autothermal steam reforming stage whereby the fuel gas comprises the light hydrocarbon feedstock.

11. A process according to claim 1 wherein the catalytic autothermal reforming is conducted at such an elevated pressure that the reformed gas stream is at the desired turbine inlet pressure.

* * * * *